March 26, 1935.  J. WOLKOFF  1,995,789
ADJUSTING DEVICE
Filed April 24, 1934
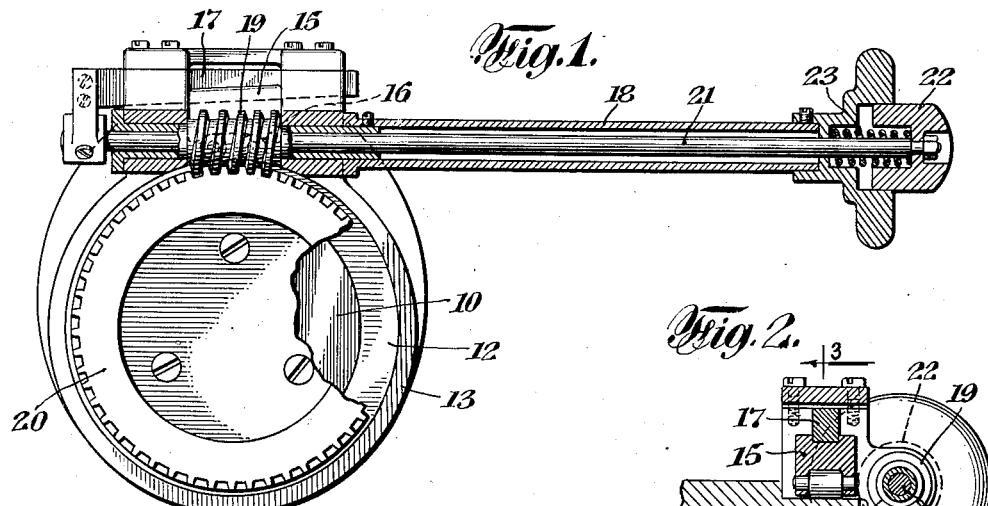
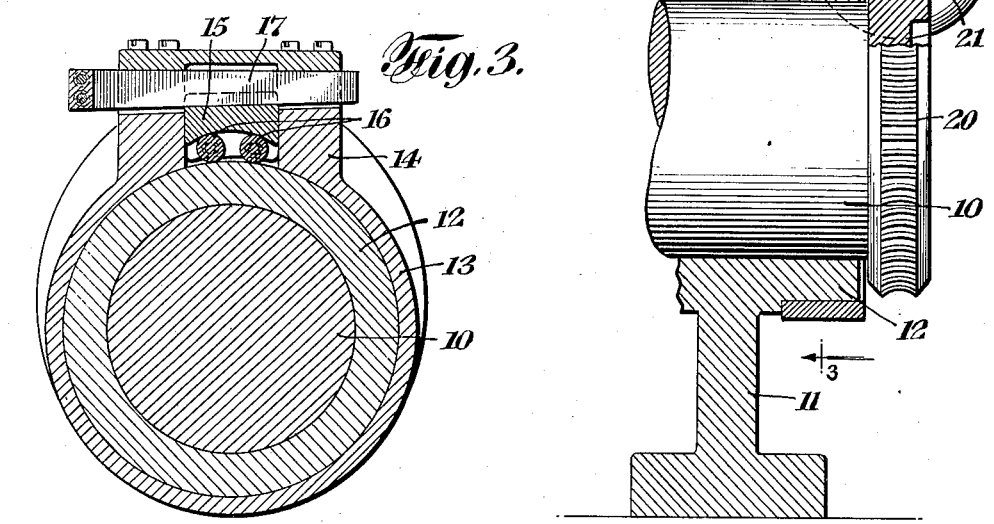
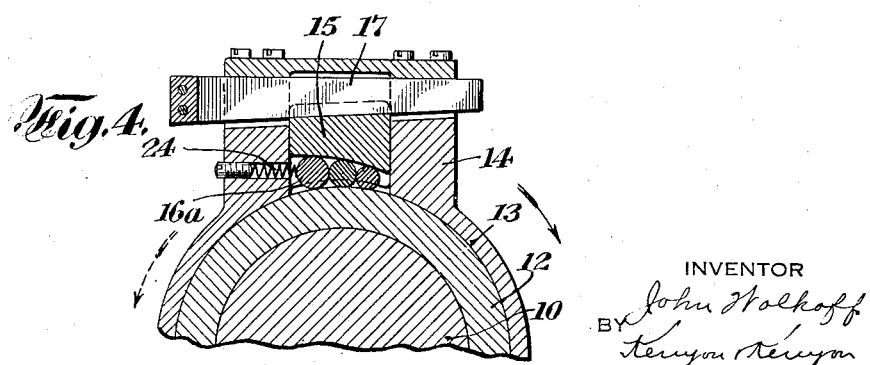
INVENTOR
John Wolkoff
BY Kenyon & Kenyon
ATTORNEYS Patented Mar. 26, 1935

1,995,789

UNITED STATES PATENT OFFICE 1,995,789

ADJUSTING DEVICE

John Wolkoff, Newark, N. J.

Application April 24, 1934, Serial No. 722,117

20 Claims. (Cl. 74—400)

This invention relates to adjusting devices and has for an object a simple, efficient, and inexpensive device for rapidly effecting approximate adjustment of a member and effecting final adjustment thereof more slowly together with application of power, if desired, to the member during final adjustment.

In one embodiment of this invention, the member to be adjusted is rotatably supported in a hub and is provided with a worm wheel. A ring is mounted for rotation on the hub and is provided with means controlled by a movable wedge for locking the ring to the hub. A handle is attached at one end to the ring for rotation about its own axis and carries a worm which meshes with the worm wheel. The wedge is operated by a rod extending axially of said handle and movable longitudinally thereof.

In order to effect approximate adjustment, the wedge is actuated by the rod to release the ring from the hub and the member and ring are turned as a unit through the medium of the handle. After approximate adjustment is effected, the wedge is again operated by the rod to lock the ring to the hub, and final adjustment is effected by rotating said handle, thereby transmitting rotary movement to said member through the medium of the worm and worm wheel.

Other objects, novel features, and advantages of this invention will be apparent from the following specification and accompanying drawing wherein Figure 1 is an end view of a device embodying the invention;

Figure 2 is a vertical section through such device;

Figure 3 is a section on the line 3—3 of Figure 2; and

Figure 4 is a view similar to Figure 3 of a modified embodiment of the invention.

Referring now to Figures 1 to 3, inclusive, a shaft or similar member 10 is rotatably supported in a frame 11 having a cylindrical hub 12. A ring 13 fits over the hub 12 and is provided with a projection 14 having a recess in which is arranged a block 15. The block 15 is capable of movement toward and away from the hub and is provided with a recess in which are arranged two rollers 16 having pintles extending into slots formed in the block, these slots being curved and extending substantially circumferentially of the hub. The recess in the block 15 has a curved surface engageable by the rollers 16, this surface being of greater curvature than the curvature of the hub 12, so that the space between the two surfaces is greater centrally than at the ends. A wedge 17 is slidably mounted in the projection 14 and one surface of the wedge engages the block 15 so that on movement of the wedge to the right, the block 15 is forced toward the hub (Figure 3).

A handle 18 is rotatably carried by the projection 14 and in turn carries a worm 19 which meshes with a worm wheel 20 carried by the shaft 10. A rod 21 extends axially of the handle 18 and is movable longitudinally thereof, the rod being connected at its left end to the left end of the wedge 17 (Figure 1). At its right end, the rod 21 is provided with a button or knob 22 and a spring 23 bears against the knob 22, tending to move the same to the right.

Assuming that it is desired to make a considerable adjustment of the shaft 10, the rod 21 is first pushed to the left and carries with it the wedge 17, thus releasing the block 15. The ring 13 is then rotated on the hub 12 by moving the outer end of the handle 18 until approximate adjustment is obtained, the rod 21 being held in this left-hand position during movement of the handle. After approximate adjustment has been effected, the rod 21 is released and the spring 23 moves it to the right, thus placing the wedge 17 in proper position to lock the block 15 against outward movement. The ring 13 is now held against movement on the hub 12 since movement thereof in either direction is prevented by the wedging of one of the rollers 16 between the curved surface of the block 15 and the surface of the hub 12. Final adjustment of the shaft 10 is effected by rotating the handle 18 about its axis, thus effecting rotary movement of the shaft through the medium of the worm 19 and worm wheel 20. The provision of the worm and worm wheel permits accurate adjustment of the shaft 10 and also permits the application of power to the same if desired.

In Figure 4 there is disclosed an embodiment of the invention in which the ring is locked against rotation only in one direction. In this modification the curvature of the surface of the recess in the block 15 is such that the space between such surface and the surface of the hub 12 is greater at one end than at the other. In this space are arranged a plurality of rollers 16a of progressively larger diameter and a spring 24 tends to urge such rollers toward the smaller end of the space above referred to. The ring is thus free to be turned at any time in a clockwise direction but can be turned in a clockwise direction only after actuation of the rod 21 to move the wedge 17 to the left. The operation of this modification is otherwise the same as the modification disclosed in Figures 1 to 3.

The device above described may be put to many different uses but is of particular utility as the means for effecting rotation of the inner field of the dynamo electric machine described and claimed in my co-pending application Serial No. 722,116, filed April 24, 1934. When put to such use the structure is the same as herein disclosed except that the adjustable member 10 is a hollow shaft or sleeve enclosing the armature shaft of the dynamo electric receiver.

It is of course understood that various modifications may be made in the structure of the device above described without in any way departing from the spirit of the invention as defined in the appended claims. For example, the two rollers 16 may be replaced by a single roller or by a ball and the rollers as well as the ball may be interposed between the rotatable member 12 and the block 15 without positive connection between the block and the rollers or ball.

I claim:

1. A device of the character described comprising a hub, a shaft rotatably mounted therein, a ring surrounding said hub, a block carried by said ring for movement toward and away from said hub, said block having a surface shaped to define with the hub surface a space of varying width, a member arranged in said space, and releasable means for holding said block in such position that said member contacts with both of said surfaces.

2. A device of the character described comprising a hub, a shaft rotatably mounted therein, a ring surrounding said hub, a block carried by said ring for movement toward and away from said hub, said block having a surface shaped to define with the hub surface a space of varying width, a rollable member arranged in said space, and releasable means for holding said block in such position that said rollable member contacts with both of said surfaces.

3. A device of the character described comprising a hub, a shaft rotatably mounted therein, a ring surrounding said hub, a block carried by said ring for movement toward and away from said hub, said block having a surface shaped to define with the hub surface a space of varying width, rollers carried by said block and arranged in said space, and releasable means for holding said block in such position that said rollers contact with both of said surfaces.

4. A device of the character described comprising a hub, a shaft rotatably mounted therein, a ring surrounding said hub, a block carried by said ring for movement toward and away from said hub, said block having a surface shaped to define with the hub surface a space of varying width, a member arranged in said space, and a movable wedge for holding said block in such position that said member contacts with both of said surfaces.

5. A device of the character described comprising a hub, a shaft rotatably mounted therein, a ring surrounding said hub, a block carried by said ring for movement toward and away from said hub, said block having a surface shaped to define with the hub surface a space of varying width, a rollable member arranged in said space, and a movable wedge for holding said block in such position that said rollable member contacts with both of said surfaces.

6. A device of the character described comprising a hub, a shaft rotatably mounted therein, a ring surrounding said hub, a block carried by said ring for movement toward and away from said hub, said block having a surface shaped to define with the hub surface a space of varying width, rollers carried by said block and arranged in said space, and a movable wedge for holding said block in such position that said rollers contact with both of said surfaces.

7. A device of the character described comprising a hub, a shaft rotatably mounted therein, a ring surrounding said hub, a block carried by said ring for movement toward and away from said hub, said block having a surface shaped to define with the hub surface a space of varying width, a member arranged in said space, a movable wedge for holding said block in such position that said member contacts with both of said surfaces, a handle carried by said ring, and a member movable in said handle for actuating said wedge.

8. A device of the character described comprising a hub, a shaft rotatably mounted therein, a ring surrounding said hub, a block carried by said ring for movement toward and away from said hub, said block having a surface shaped to define with the hub surface a space of varying width, a rollable member arranged in said space, a movable wedge for holding said block in such position that said rollable member contacts with both of said surfaces, a handle carried by said ring, and a member movable in said handle for actuating said wedge.

9. A device of the character described comprising a hub, a shaft rotatably mounted therein, a ring surrounding said hub, a block carried by said ring for movement toward and away from said hub, said block having a surface shaped to define with the hub surface a space of varying width, rollers carried by said block and arranged in said space, a movable wedge for holding said block in such position that said rollers contact with both of said surfaces, a handle carried by said ring, and a member movable in said handle for actuating said wedge.

10. A device of the character described comprising a hub, a shaft rotatably mounted therein, a ring surrounding said hub, a block carried by said ring for movement toward and away from said hub, said block having a surface shaped to define with the hub surface a space of varying width, a member arranged in said space, a movable wedge for holding said block in such position that said member contacts with both of said surfaces, a handle rotatably carried by said ring, a member extending through said handle and movable therein to actuate said wedge, a worm carried by said handle, and a worm wheel carried by said shaft in mesh with said worm.

11. A device of the character described comprising a hub, a shaft rotatably mounted therein, a ring surrounding said hub, a block carried by said ring for movement toward and away from said hub, said block having a surface shaped to define with the hub surface a space of varying width, a rollable member arranged in said space, a movable wedge for holding said block in such position that said rollable member contacts with both of said surfaces, a handle rotatably carried by said ring, a member extending through said handle and movable therein to actuate said wedge, a worm carried by said handle, and a worm wheel carried by said shaft in mesh with said worm.

12. A device of the character described comprising a hub, a shaft rotatably mounted therein, a ring surrounding said hub, a block carried by said ring for movement toward and away from said hub, said block having a surface shaped to define with the hub surface a space of varying width, rollers carried by said block and arranged in said space, a movable wedge for holding said block in such position that said rollers contact with both of said surfaces, a handle rotatably carried by said ring, a member extending through said handle and movable therein to actuate said wedge, a worm carried by said handle, and a worm wheel carried by said shaft in mesh with said worm.

13. A device of the character described comprising a hub, a shaft rotatably mounted therein, a ring surrounding said hub, a block carried by said ring for movement toward and away from said hub, said block having a curved surface of greater curvature than the surface of said hub, a member arranged between said surfaces, and releasable means for holding said block in such position that said member contacts with both said surfaces.

14. A device of the character described comprising a hub, a shaft rotatably mounted therein, a ring surrounding said hub, a block carried by said ring for movement toward and away from said hub, said block having a curved surface of greater curvature than the surface of said hub, a rollable member arranged between said surfaces, and releasable means for holding said block in such position that said rollable member contacts with both said surfaces.

15. A device of the character described comprising a hub, a shaft rotatably mounted therein, a ring surrounding said hub, a block carried by said ring for movement toward and away from said hub, said block having a curved surface of greater curvature than the surface of said hub, rollers carried by said block and arranged between said surfaces, and releasable means for holding said block in such position that said rollers contact with both said surfaces.

16. A device of the character described comprising a hub, a shaft rotatably mounted therein, a ring surrounding said hub, a block carried by said ring for movement toward and away from said hub, said block having a curved surface of greater curvature than the surface of said hub, a rollable member arranged between said surfaces, releasable means for holding said block in such position that said rollable member contacts with both said surfaces, a handle carried by said ring, and a member extending through said handle and being movable to actuate said releasable means.

17. A device of the character described comprising a hub, a shaft rotatably mounted therein, a ring surrounding said hub, a block carried by said ring for movement toward and away from said hub, said block having a curved surface of greater curvature than the surface of said hub, a rollable member arranged between said surfaces, releasable means for holding said block in such position that said rollable member contacts with both said surfaces, a handle carried by said ring, and a member extending through said handle and being movable to actuate said releasable means, said handle being rotatable and being provided with a worm and a worm wheel carried by said shaft in mesh with said worm.

18. A device of the character described comprising a hub, a shaft rotatably mounted therein, a ring surrounding said hub, a block carried by said ring for movement toward and away from said hub, said block having a curved surface of greater curvature than the surface of said hub, rollers carried by said block and being arranged between said surfaces, and a movable wedge for holding said block in such position that said rollers contact with both of said surfaces.

19. A device of the character described comprising a hub, a shaft rotatably mounted therein, a ring surrounding said hub, a block carried by said ring for movement toward and away from said hub, said block having a curved surface of greater curvature than the surface of said hub, rollers carried by said block and being arranged between said surfaces, a movable wedge for holding said block in such position that said rollers contact with both said surfaces, a handle carried by said ring, and a rod connected to said wedge and extending through said handle, said rod being movable to actuate said wedge.

20. A device of the character described comprising a hub, a shaft rotatably mounted therein, a ring surrounding said hub, a block carried by said ring for movement toward and away from said hub, said block having a curved surface of greater curvature than the surface of said hub, rollers carried by said block and being arranged between said surfaces, a movable wedge for holding said block in such position that said rollers contact with both said surfaces, a handle rotatably carried by said ring, a rod connected to said wedge and extending through said handle, said rod being movable to actuate said wedge, a worm on said handle, and a worm wheel carried by said shaft in mesh with said worm.

JOHN WOLKOFF.